D. WILLIAMS.
Carving-Fork.
No. 208,354.  Patented Sept. 24, 1878.
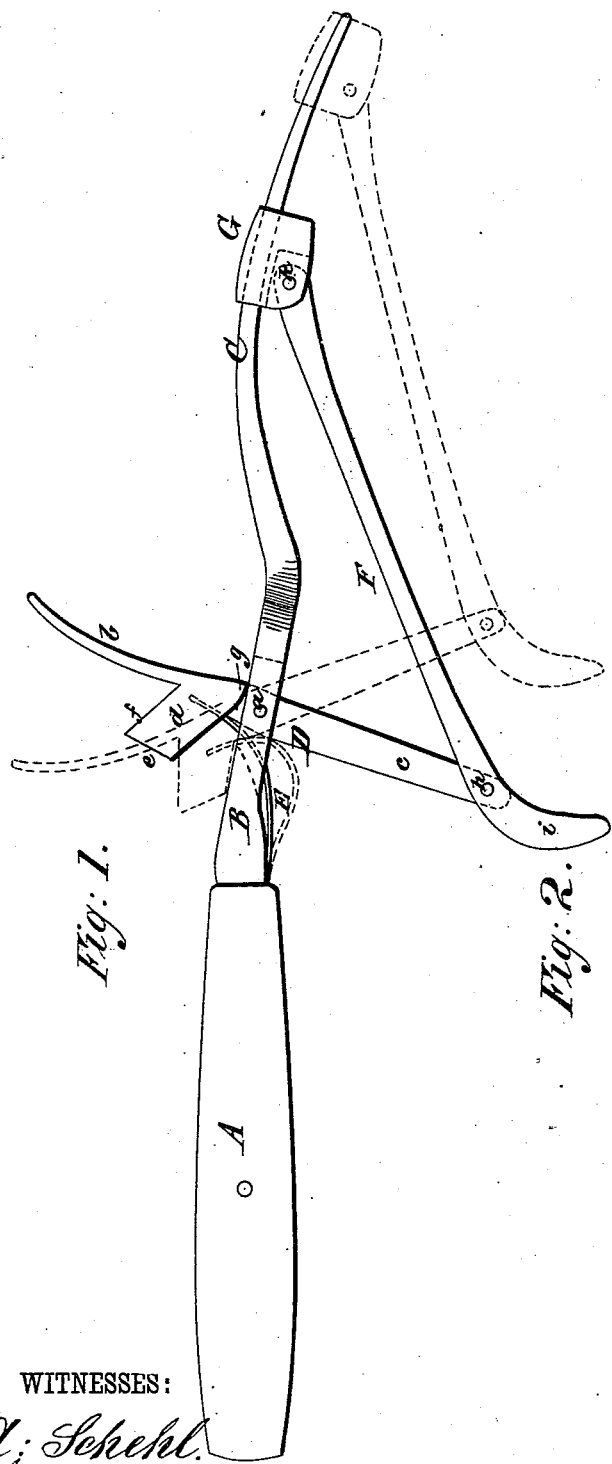
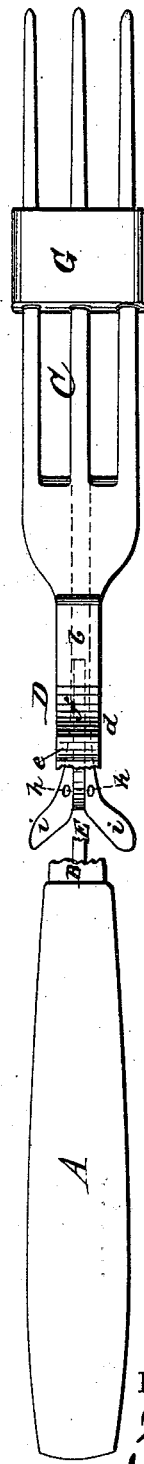
WITNESSES:
A. Schehl.
C. Sedgwick.
INVENTOR:
D. Williams
BY Munn & Co
ATTORNEYS.

UNITED STATES PATENT OFFICE.

DANIEL WILLIAMS, OF WEST PHILADELPHIA, PENNSYLVANIA.

IMPROVEMENT IN CARVING-FORKS.

Specification forming part of Letters Patent No. 208,354, dated September 24, 1878; application filed August 7, 1878.

*To all whom it may concern:*

Be it known that I, DANIEL WILLIAMS, of West Philadelphia, in the county of Philadelphia and State of Pennsylvania, have invented a new and Improved Carving-Fork, of which the following is a specification:

The object of my invention is to provide an improved attachment to carving-forks for releasing from the fork any substance held by it.

The invention will first be described in connection with the drawing, and then pointed out in claim.

In the accompanying drawing, Figure 1 represents a side view, and Fig. 2 a plan view, of my improved carving-fork.

Similar letters of reference indicate corresponding parts.

The handle A, shank B, and tines C are of the usual construction. The shank B has a slot through it, in which the guard-lever D is pivoted at *a*.

The lever D is formed by extending the forward bent guard, *b*, below the pivoting-point *a*, to form the arm *c*, and providing the back of the guard *b* with an extension, *d*, having surfaces *e f* suitable to be pressed upon by the forefinger of the hand holding the handle A of the fork.

E is a spring, riveted at the under side of the shank B within the handle A and extending forward up through the slot in the shank B, its end pressing upon the under side of the finger-piece *d* at the back of the guard *b*, to keep the latter in the position shown in full lines in the drawing, with the shoulder *g* acting as a stop against the upper surface of the shank.

G is a block or cross-head, having holes through it corresponding to the tines C, so that the said block G may be slid upon the said tines, and is connected to the end of the arm *c* of the guard-lever D by the rod F, pivoted at *k*, with its forward end to the block G, and at *h*, with its rear end to the lever D. At the said point *h* the rod F is provided with downward-diverging legs *i*, on which the fork may be supported.

In using the fork the forefinger is pressed upon the surface *e* of the finger-piece *d*, instead of directly on the back of the guard *b*, as usual. The block G, held in position by the rod F connecting it to the lever D, prevents the tines C from cutting too deeply.

To release a substance picked up or held by the fork, it is only necessary to press with the forefinger upon the surface *f* of the finger-piece *d*, and thus move the parts in the position shown in dotted lines, sliding the block G to the ends of the tines C.

I am aware that it is not new to connect a push-block on the prongs of a fork with the pivoted guard by a rod; but

What I claim is—

A fork provided with a guard-lever, D, fulcrumed between its arms *b c* in a slot of shank, the arm *b* being pressed by a spring, and the arm *c* connected by rod F with slide-block G, as shown and described.

DANIEL WILLIAMS.

Witnesses:
 HERMAN L. BUHLER,
 JAMES YOUNG.